May 24, 1927.
O. N. TEVANDER
BOTTLE CAPPING MACHINE
Filed July 2, 1923
1,629,599
6 Sheets-Sheet 1
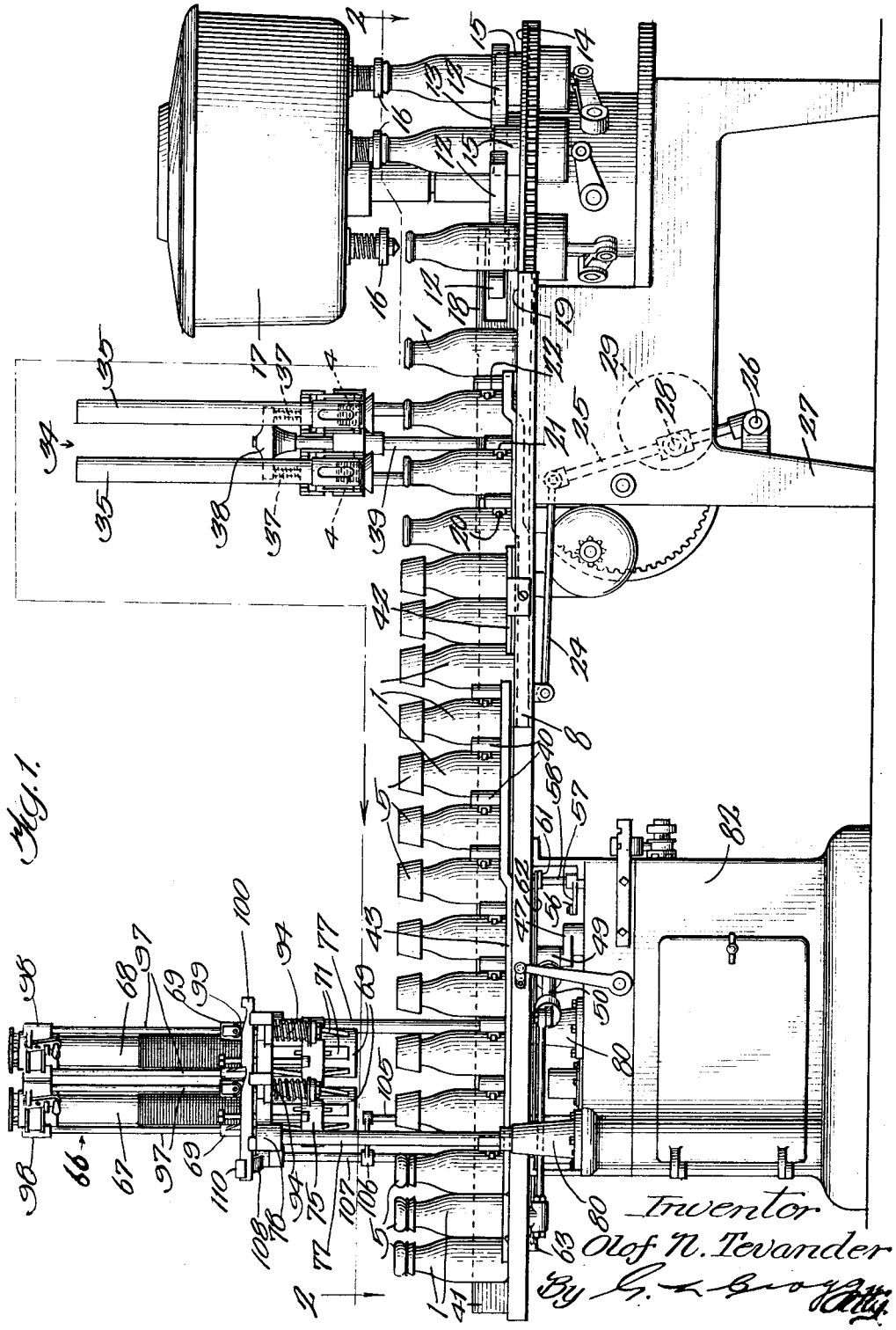
Inventor
Olof N. Tevander May 24, 1927.
O. N. TEVANDER
1,629,599
BOTTLE CAPPING MACHINE
Filed July 2, 1923
6 Sheets-Sheet 2
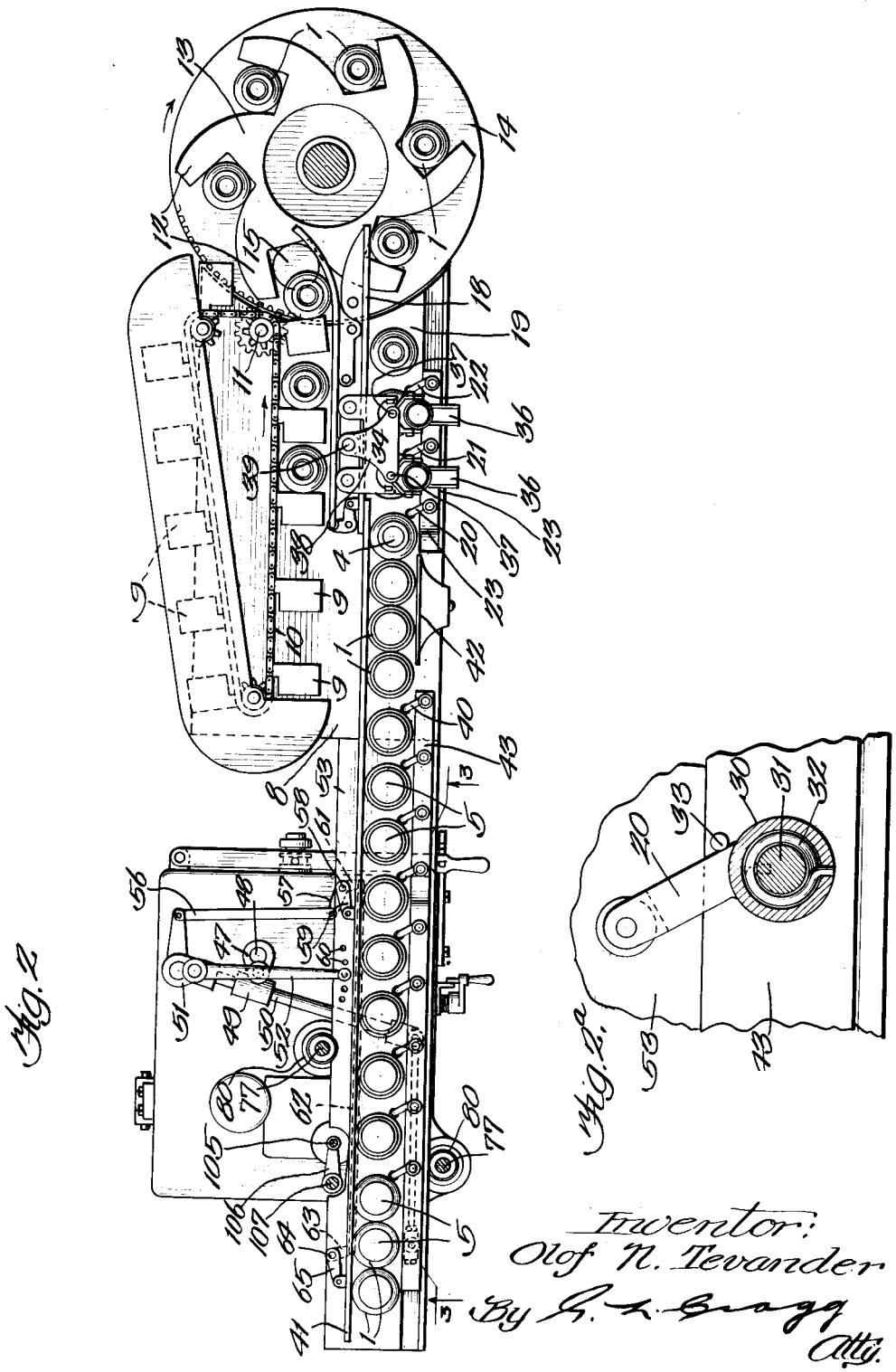
Inventor:
Olof N. Tevander
By G. L. Bragg
Atty.

May 24, 1927.  
O. N. TEVANDER  
1,629,599  
BOTTLE CAPPING MACHINE  
Filed July 2, 1923  
6 Sheets-Sheet 3
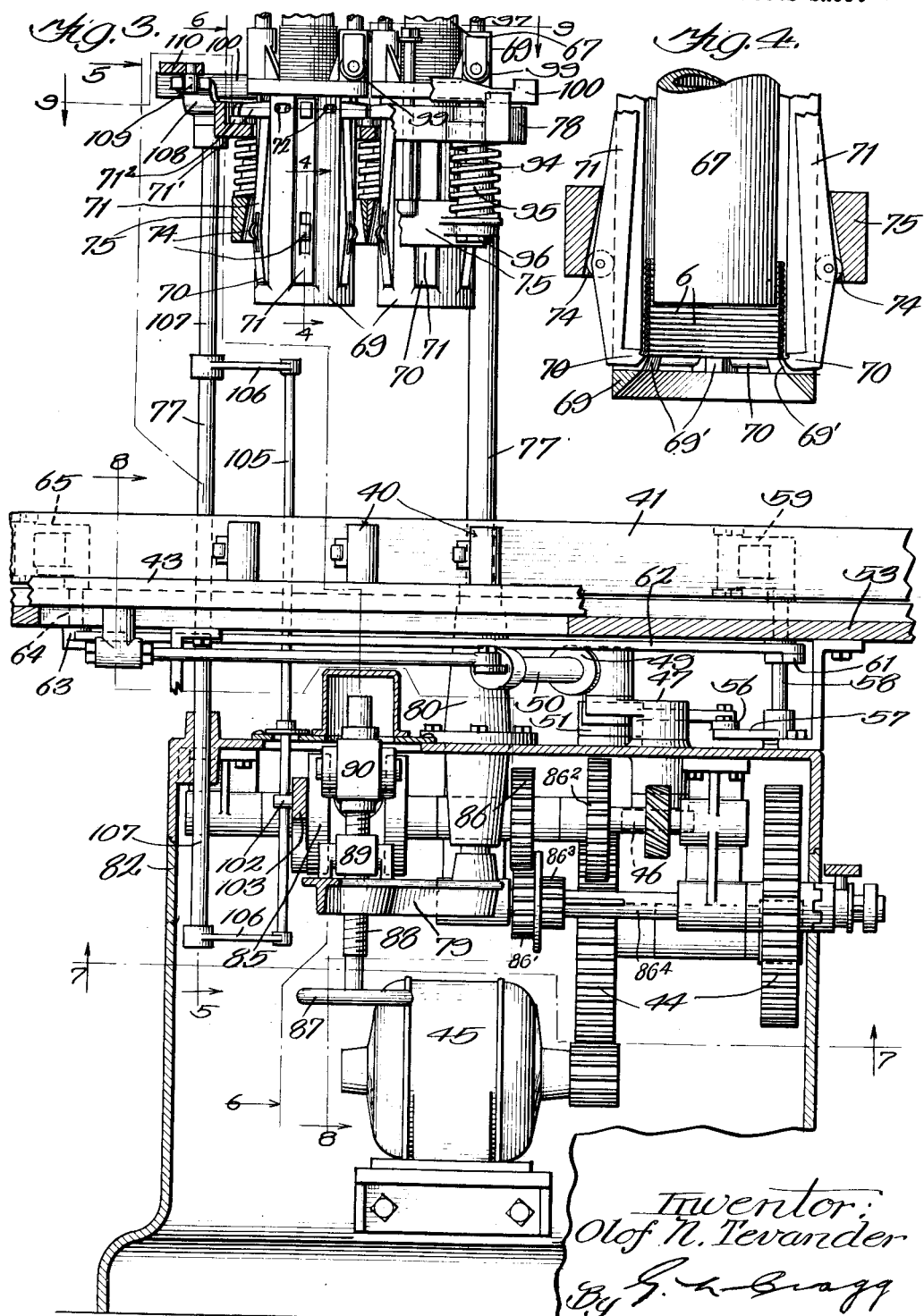
Inventor:
Olof N. Tevander
By G. L. Gragg
Atty.

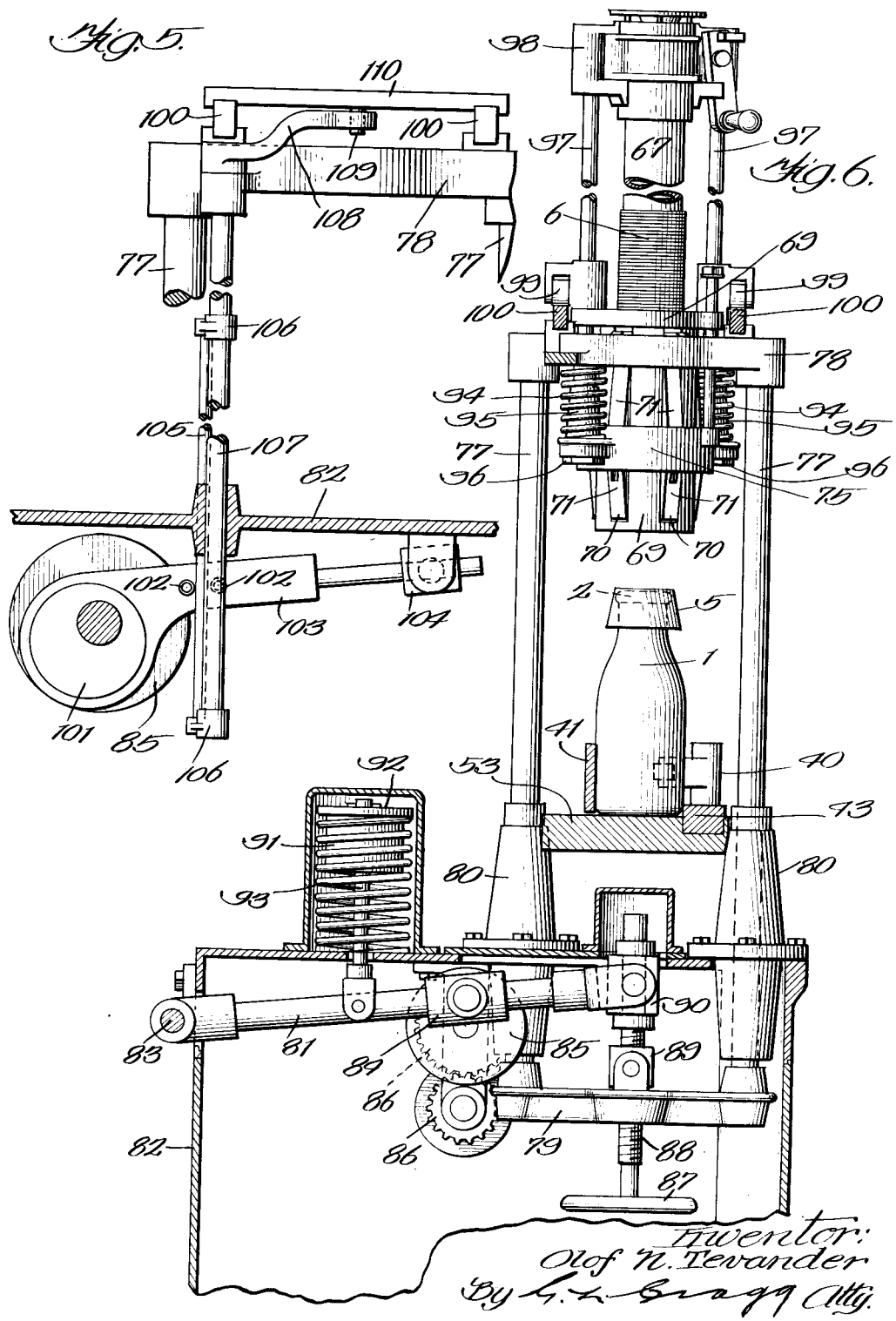

May 24, 1927.                                                                1,629,599
O. N. TEVANDER
BOTTLE CAPPING MACHINE
Filed July 2, 1923                              6 Sheets-Sheet 5
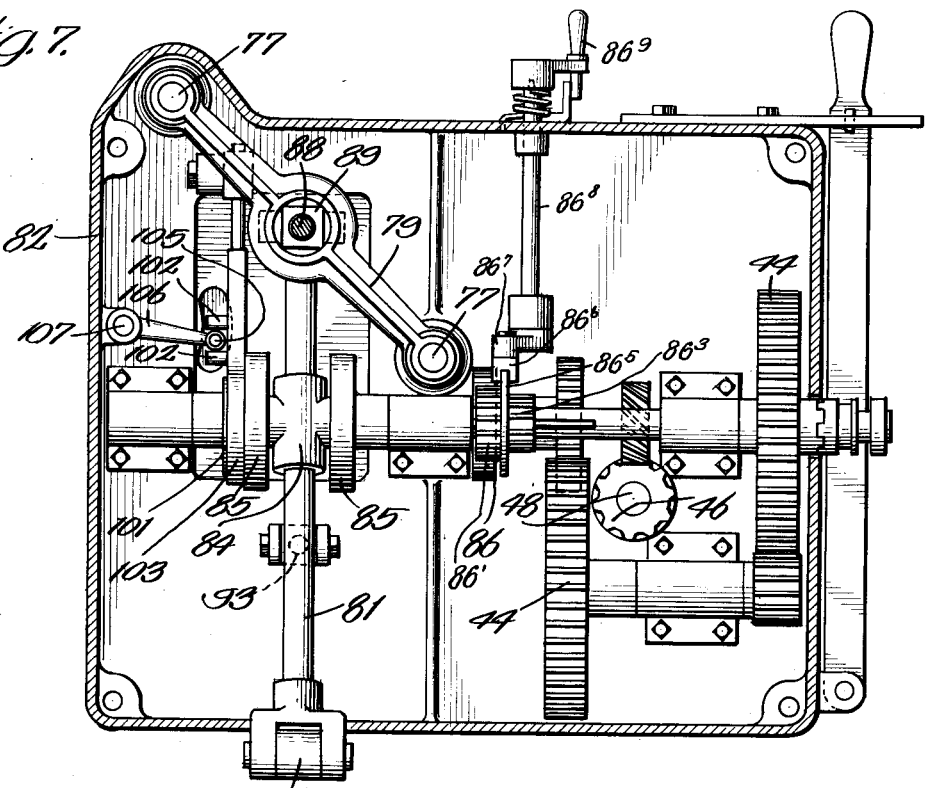
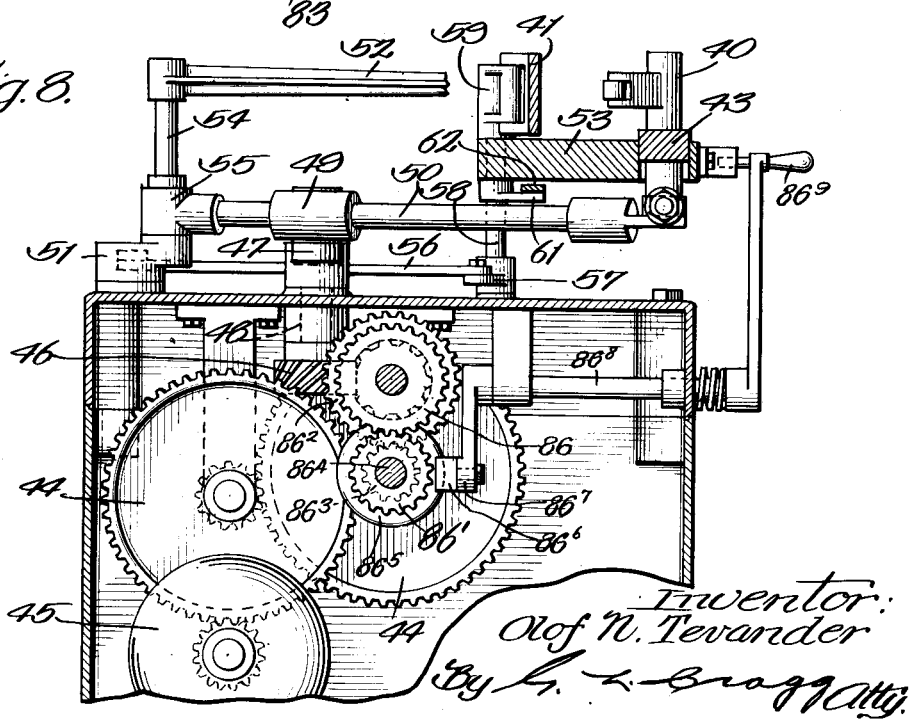
Inventor:
Olof N. Tevander May 24, 1927.                          1,629,599
O. N. TEVANDER
BOTTLE CAPPING MACHINE
Filed July 2, 1923          6 Sheets-Sheet 6
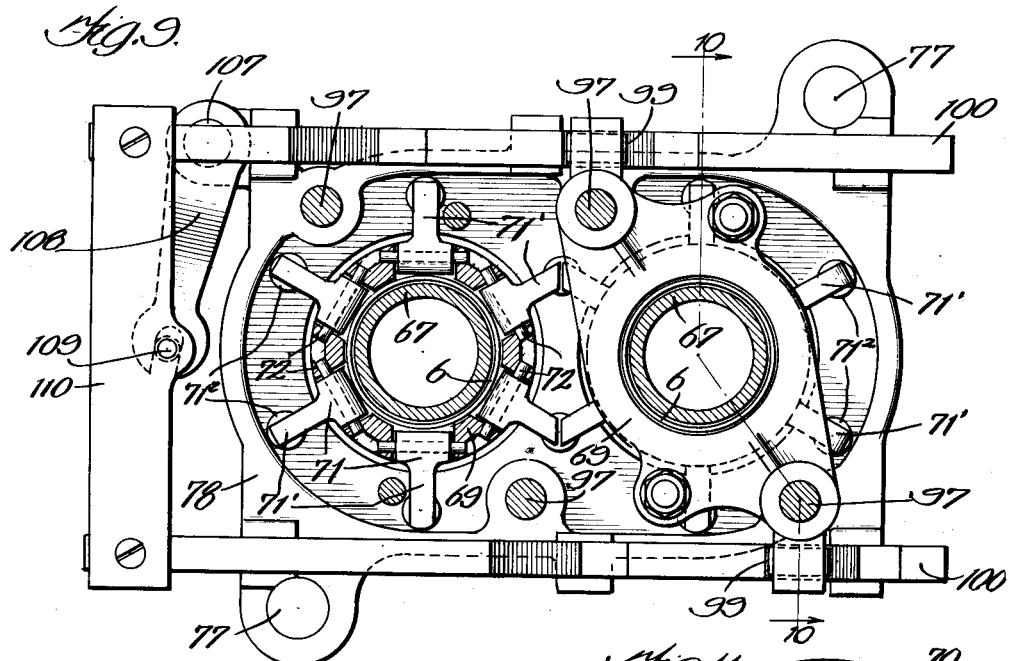
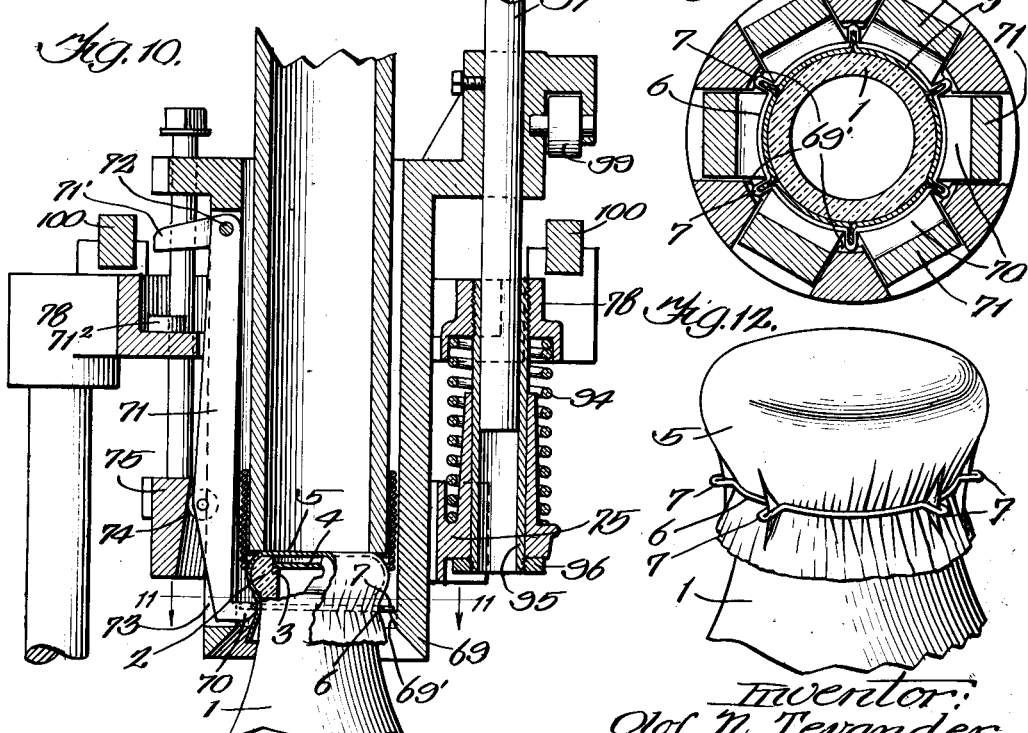

Patented May 24, 1927.

1,629,599

UNITED STATES PATENT OFFICE.

OLOF N. TEVANDER, OF CHICAGO, ILLINOIS, ASSIGNOR TO STANDARD CAP & SEAL CORPORATION, OF CHICAGO, ILLINOIS, A CORPORATION OF VIRGINIA.

BOTTLE-CAPPING MACHINE.

Application filed July 2, 1923. Serial No. 649,159.

My invention relates to bottle capping machines and has a number of objects and advantages in view.

In accordance with one characteristic of the invention mechanism is employed for crimping or otherwise contracting bands or rings about the skirts of bottle caps, this mechanism including jaws for crimping the bands and mechanism to arrest the jaws before they crimp the bands in order that the bottle necks may be passed through the bands prior to the crimping action.

The invention will be more fully explained by reference to the accompanying drawings illustrating the preferred embodiment thereof and in which Fig. 1 is a side elevation of a bottle capping machine embracing the invention; Fig. 2 is a plan sectional view taken on line 2—2 of Fig. 1; Fig. 2ª is a detail for illustrating the construction and arrangement of one of the pawls shown in Fig. 2; Fig. 3 is a sectional view on line 3—3 of Fig. 2; Figs. 4, 5, 6, 7, 8 and 9 are sectional views taken, respectively, on lines 4—4, 5—5, 6—6, 7—7, 8—8 and 9—9 of Fig. 3; Fig. 10 is a sectional view on line 10—10 of Fig. 9 but showing a changed position occurring upon insertion of a bottle; Fig. 11 is a sectional view on line 11—11 of Fig. 10; and Fig. 12 is a perspective view of the upper portion of a completely capped bottle.

Like parts are indicated by similar characters of reference throughout the different figures.

The milk bottles 1 are formed each with an outsetting bead 2 at its mouth and there is an annular shoulder 3 within the bead upon which a closure disc 4 may be seated. Each bottle is also desirably further closed by means of a closure cap 5 whose skirt surrounds the bottle and extends below the bead 2. A metallic band 6 is passed around the skirt of each cap and is contracted by being crimped as indicated at 7 whereby the cap skirt is gathered and held in close assembly with the bottle. Generally, portions of the cap skirt are gathered in with the crimps 7. The cap serves very effectively to close the bottle but, further to guard against the access of foreign matter to the interior of the bottle, the disc 4 is employed.

The bottles which are to be filled are initially placed upon a deck 8 by hand, these bottles being located between the fingers 9 that project laterally from an endless conveying sprocket 10 which is drawn through the intermediation of suitable gearing 11 in a counter-clockwise direction as viewed in Fig. 2. Each bottle engaging finger 9 pushes the bottle into the spaces between the large teeth 12 upon a constantly and clockwise rotating wheel 13. Each bottle is snugly bottomed by its actuating finger 9 against the bottom of the intertooth space that receives it. A rotating table 14 is co-axial with and located beneath the wheel 13 to receive the bottles. The table and wheel are in fixed relation to enable the table to be provided with plungers 15 in register with the bottles whereby the bottles may be lifted to engage valve heads 16 which depend from suitable valves that control the flow of liquid, such as milk, from the container 17 into the bottles.

As illustrated, four of the bottles are filled simultaneously and the filled bottles are removed singly from the rotating table by means of the bottle dislodging fork 18 which straddles the teeth of the wheel 13. This fork acts in cooperation with the curved side of the tooth engaging the bottle that is being moved to shift this bottle from the rotating table 14 to the stationary deck 19. A plurality of pushing pawls 20, 21, 22 are mounted upon the common bar 23 which is reciprocated in a direction parallel with the bottle engaging face of the fork 18. The mechanism for reciprocating the bar 23 includes a connecting rod 24 which is joined with the bar at one end and at its other end is connected with one end of a link 25 whose other end is pivoted at 26 upon the frame 27 which carries the mechanism so far specifically described. The link 25 is in sliding relation with a sleeve 28 that is mounted to oscillate upon a suitably driven disc 29.

The pawls 20 are pressed by a light spring pressure in a clockwise direction and, in the preferred embodiment of the invention, each pawl has a hollow hub portion 30 carried upon a stationary pin 31 through the intermediation of a coiled spring 32, one end of this spring being secured to the hub 30 and the other end to the pin 31. This spring, when free to function fully, presses the pawl 20 against the stationary stop 33 in a clockwise direction. As the bottles are forced upon the deck 19 they depress the pawls 20 in a counter-clockwise direction in opposition to the force of their springs 32, this action continuing until the bottles clear the pawls upon the springs 32 and restore the pawls that are then in pushing relation to the bottles engaging the same when the pawl bar 23 is moved in a bottle pushing direction, that is to the left as illustrated in Fig. 2.

There are three pawls 20 for pushing the bottles on the deck 19 to the left. The two right handed pawls serve to position two bottles beneath the disc applying machine 34. This disc applying machine includes two tubular magazines 35 for containing the discs 4. Pushers 36, actuated by any suitable mechanism not necessary to be shown, move through the magazines to eject the discs 4 singly therefrom. The ejected discs are pushed into alignment with the bottles and are forced upon the seats 3 by means of the plungers 37 which operate to perform this function while the pawls 20 are being retracted to the right to engage new bottles. These plungers are carried upon the crosshead 38 which in turn is carried upon an actuating stem 39 that is vertically reciprocated by any suitable mechanism not necessary to be shown, this mechanism serving to move the plungers downwardly sufficiently to press two discs 4 upon their seats 3. The bottles, after being supplied with the discs 4, are moved to the left on the deck 19 into the range of another pawl 40 constructed and operating similarly to the pawl 20. There are a number of pawls 40 each adapted to engage a filled bottle that has a cap applied thereto. These pawls engage the bottles and push them along the straight channel way which is defined by the bar 41 upon one side and on the other side by the block 42, and the pawls 40 upon the pawl bar 43. The pawl bar 43 is desirably located in the same plane and on the same level with the pawl bar 23. The pawl bar 43 is reciprocated longitudinally of the machine in order that it may move the bottles when moved in one direction and may escape the bottles to have one or more of them engage new bottles when moved in the reverse direction.

The mechanism for reciprocating the bar 43 desirably includes a train of gears 44 driven at one end by the motor 45 and terminating at its other end in a worm 46. A crank 47 is secured at one end to the shaft 48 of the worm 46. The other end of the crank is pivotally connected with the sleeve 49 that surrounds and slides upon a link 50. This link is pivotally connected at one end with a pawl bar 43 and at its other end with one end of a bell crank 51. An arm 52 is connected at one end with the deck 53 that receives the bottles from the deck 19 and at its other end is fixedly carried upon a shaft 54 that is in fixed connection with the bell crank 51. The link 50 terminates in an upright sleeve 55 that surrounds and turns upon the shaft 54. By turning the arm 52 the bell crank 51 is adjusted whereby the extent of oscillation of the rod 50 at the bar 43 is adjusted. By this mechanism the bottles are fed directly beneath the capping mechanism to be described, the adjustment of the extent of oscillation of the rod 50 being determined according to the sizes of bottles that are to be capped. At the same time the channelway for the bottles that are being fed toward the capping machine has its width adjusted according to the size of the bottles traversing the channelway. This adjustment is effected by a movement of the bar 41 transversely of the pawl bar 43. To this end one end of the bell crank 51 is connected with one end of a link 56 whose other end is connected with a lever 57 fixed upon a shaft 58 that is in fixed connection with one end of another lever 59 whose other end is pivotally connected with the bar 41. Whenever the arm 52 is moved to adjust the extent of oscillation of the end of the rod 50 that is pivotally connected with the bar 43 the lateral position of the bar 41 is also adjusted. A pin may be employed to hold the arm 52 in selected adjustment, this pin passing through the outer end of the arm and into a selected one of the arcuate row of holes 60 formed in the deck 53.

The movement of the bar 41 should be at right angles to its length, to which end an arm 61 is fixed upon the shaft 58, this arm 61 being connected by a rod 62 with an arm 63 rigid upon a shaft 64. An arm 65 is rigidly connected at one end with the shaft 64 and at its other end is pivotally connected with the bar 41. By means of the linking rod 62 and the parts by which this rod is connected with the bar 41, the bar 41 is constrained to move transversely in a direction that is perpendicular to its length so that any adjustment made in the width of the channel that conveys the bottles to the capper is uniform throughout the length of the channel. The extent of reciprocal movements of the bar 43 is such that the entire row of bottles engaged by the pawls 40 is moved the space of two bottles and two bottles are newly positioned, each time, under the capper device 66. This capper device is equipped to secure two caps upon each operation, these caps being positioned upon the bottles by hand as these bottles move from the disc applying machine to the cap applying machine. As hitherto stated, each cap is secured to the bottle by means of a ring 6. These rings are contained in magazines 67 and 68 from which they are singly applied to the caps that have been placed upon bottles. Each magazine is surrounded by the rings and the rings themselves are loosely housed in a jaw carrier 69. There are a number of jaws 70 upon each jaw carrier, each of these jaws being provided upon the lower end of an arm 71 which is pivoted at its upper end to the jaw carrier as indicated at 72. There are desirably six of these arms spaced sixty degrees apart and each arm plays in a slot 73 formed in the side of the jaw carrier 69.

Each arm 71 carries a cam roller 74. A cam member 75 surrounds the rollers 74 and is downwardly and outwardly sloped where these rollers are located. By effecting relative movement between the rollers 74 and cam member 75 in a direction that will bring the rollers nearer the top of the cam member the jaws 70 are caused to engage the lowermost one of the rings 6 and by suitable downward movement of the arms as effected by downward movement of the jaw carrier 69 this ring is forced downwardly over the bottle cap 5, the rings above this one being usually prevented from following by resting upon the top of the bottle cap as illustrated in Fig. 10. The initial movement of the cam member 75 with respect to the cam roller 74 is only slight, just sufficient to engage the jaws 70 with the lowermost ring or band 6. After the lowermost ring has been placed in the desired zone the jaws 70 are forced toward the bottle neck to crimp the ring 6 about the cap skirt.

The mechanism for effecting the desired relative movements of the jaws 70, the magazines for the rings 6, the jaw holder 69, the cam member 75, etc. will now be described.

The main carrier for the capping mechanism includes two upright rods 77 joined at their upper ends by a crosshead 78 and at their lower ends by a crosshead 79. These rods are mounted to reciprocate within bearing sleeves 80. The lower crosshead 79 is adjustably connected with one end of an arm 81 whose other end is pivotally connected with the frame portion 82 of the machine, as indicated at 83. The arm 81 slides through a sleeve 84 which is swivelled upon discs 85 which are rotated by the meshing gears 86, 86', or at a slower speed, by the gears 86², 86³. The gears 86, 86² are coupled and turn with the discs 85. The gears 86', 86³ are coupled and turn with the shaft 86⁴ on which they are splined. This shaft is driven by the motor 45 through the intermediation of the illustrated gearing. A collar 86⁵ fixed upon gears 86', 86³ is embraced by a fork 86⁶ mounted upon a crank arm 86⁷ carried upon a rod 86⁸. An operating handle 86⁹ is at the other end of this rod. By turning this handle the fork 86⁶ may move the gears 86', 86³ to the right (Figs. 3 and 7) to unmesh the gears 86, 86' and bring the gears 86³, 86² into mesh to reduce the speed of the disks 85. By means of the gearing and connections just described the rods 77 are reciprocated vertically. The location of the range of movement of the rods 77 and the crossheads 78, 79 is adjustably determined, to suit the heads of the bottles being capped, by means of the hand wheel 87 whose shaft 88 is in threaded connection with a nut 89 swivelled upon the crosshead 79, this shaft 88 being in unthreaded connection with a sleeve 90 that is pivotally connected with the outer end of the arm 81, the sleeve 90 being immovable longitudinally of the shaft 88 but permitting the shaft to turn with respect thereto. A counterbalancing spring 91 is bottomed at one end upon the frame 82 and supports the head 92 upon a rod 93 that is pivotally connected with the arm 81. This spring takes part in elevating the rods 77 and the crossheads 78, 79.

The framework 77, 78, 79 is normally in its uppermost position. Each time a pair of bottles is placed below the ring applying mechanism, this mechanism is drawn downwardly by the mechanism previously described. During the downward movement of the frame 77, 78, 79 the crosshead 78 presses downwardly upon the springs 94 to press the cam member 75 downwardly an equal distance. The crosshead 78 carries guiding sleeves 95 which have nuts 96 screwed upon their bottoms to support the cam member 75. The lower ends of upright rods 97 move in the bores of said sleeves, the upper ends of these rods being rigidly secured to the locking head 98 that rigidly holds the upper ends of the magazines 67, 68. The jaw carrier 69 is rigidly secured to the rods 97 to move up and down therewith, the jaw carrier and the magazine 67 or 68 surrounded thereby moving as a unit. The jaw carrier 69 has cam rollers 99 mounted thereon, these cam rollers turning upon the cam tracks 100. The cam tracks are upon the cross head 78 which is in supporting relation to the jaw carrier 69 and the magazine 67 through the intermediation of the tracks 100 and rollers 99. These cam tracks are reciprocated in order to slightly elevate the rollers 99 and the jaw carrier which carries them and the magazine, all with reference to the cross head 78, whereby the jaws 70 are partially approached to catch the lowermost ring at the magazine preparatory to the crimping operation effected by further movement of the jaws 70. The cam tracks 100 are reciprocated by means of the eccentric 101, on the shaft carrying the discs 85, operating through the pins 102 carried upon an arm 103 projecting from the eccentric. The arm 103 has an extension which slides through the sleeve 104 which is pivotally mounted upon the frame of the machine. A rod 105 passes snugly between the pins 102 in a vertical direction. As the eccentric operates the rod 105 is moved in the plane of rotation thereof and as this rod is connected with the outer ends of the arms 106, said rod 107 is caused to oscillate. This rod is connected with the cam tracks 100 through the intermediation of the arm 108, the pin 109, and the cross bar 110 rigidly secured to said cam tracks. The cam tracks 100, the jaw carrier 69 and the jaws 70 cooperate to position the ring 6 that is next to be applied. When the jaw carrier 69 is stopped by the bottle engaging the magazine within it, the downward movement of the cam 75 continues to bring the jaws 70 closer about the bottle to crimp the band, as illustrated in Fig. 12. When the cam rollers 99 are in the bottoms of the cam recesses in the cam tracks as the band applying mechanism is being elevated, the jaws 70 will spread apart, permitting the next ring to fall upon the horns 69' in the jaw carrier 69, these horns positioning the ring resting thereon in place to be engaged by the jaws 70, the jaws having ring holding formations in the zone of the ring that is upon the horns 69'. The arms which carry the jaws 70 have extensions 71' engageable by the abutments 71ª when the jaw carrier is lowermost to spread the jaws apart to release the ring therein.

Each pair of bottles arrested below the jaw carriers 69, is in register with these jaw carriers and the ring holding magazines 67 that move as a unit with said carriers. When the bottles are thus positioned with respect to the jaw carriers and the magazines, said magazines and carriers are lowered as a unit by lowering the rods 77 in the manner described together with the cross head 78 fixed on these rods, the horizontal cam tracks 100 upon the cross head and the jaw carriers 69 which are supported upon the cross head through the intermediation of the cam rollers 99 and the tracks 100. The jaw carriers and magazines are moved up slightly with respect to the cam 75 upon corresponding horizontal adjustment of the cam tracks which brings the high parts of the tracks beneath the rollers to slightly lift them together with the carriers and magazines. This adjustment of the cam tracks occurs during the initial part of the lowering of the cross head 78 and is retained during the balance of the downward movement of the crosshead, the jaws 70 being thereupon given the initial part of their inward movement by the cam 75 merely to lightly engage the jaws with the bottommost rings that rest upon the horns 69' without then crimping these rings, whereby the caps upon the bottles are prevented from placing these lowermost rings out of the zone of said jaws 70 in which they are to be held while the rings are afterward being crimped or contracted by the jaws upon the bottle caps.

The jaw carriers, magazines, the cam member 75, cross head 78 and the adjusted cam tracks thereafter continue downwardly until the tops of the two bottles engage the bottoms of the magazines 67, whereupon the jaw carriers 69 and the magazines 67 are arrested by the latter from further downward movement, the cam member 75, however, continuing to move downwardly, as the rods 77 and cross head 78 have not yet completed their downward movement. This cross head operates during the continuation of its downward movement through the springs 94 to move the cam member 75 downward to move the ring holding ends of the jaws 70 in the final and ring crimping portions of their inward movements. After the rings have been crimped around the bottle caps, the jaw carriers, magazines and the cam member 75 are raised and restored to their initial positions, the cam tracks 100 also being shifted to their initial positions in which their depressed portions engage the rollers 99 upon the jaw carriers, whereby the ring applying mechanism is placed in readiness to operate upon a succeeding pair of bottles.

Referring to Figs. 6 and 10 it will be observed that the bottle caps 5 are illustrated as holding all of the rings around the magazines except the lowermost rings that are caught by the jaws 70. This is due to the initial conical tapering of the caps illustrated in Fig. 6. However, the holding of all except the bottom rings by the caps is not an essential result as in some cases some of the rings above the bottom rings may rest upon the tops of the jaws 71 without interfering with the operation of the machine.

As illustrated, the bottles serve to position the jaw carriers by engaging the magazines that are coupled with the jaw carriers. If a bottle is absent the corresponding cam 75 and the corresponding jaw carrier 69 will both move without crimping the ring held by the jaws.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A bottle capping machine including a movable magazine for holding rings and formed to permit rings to drop therefrom; a jaw carrier surrounding and assembled with said magazine and mounted to be movable therewith, this jaw carrier being formed to catch and position a ring falling from the magazine; a plurality of jaws mounted upon the jaw carrier and having ring holding formations in the zone in which the ring is positioned; a cam surrounding said jaw carrier and in contracting relation to said jaws to cause the jaws initially to hold the ring positioned upon the jaw carrier and thereafter to contract this ring; mechanism for causing initial movement of the cam with respect to the jaws to initially hold a ring; and means for positioning a bottle to be surrounded by the ring to engage the magazine to enable relative movement of the jaw carrier and cam to move the jaws further to contract the ring.

2. A bottle capping machine including a movable magazine for holding rings and formed to permit rings to drop therefrom; a jaw carrier surrounding and assembled with said magazine and mounted to be movable therewith, this jaw carrier being formed to catch and position a ring falling from the magazine; a plurality of jaws mounted upon the jaw carrier and having ring holding formations in the zone in which the ring is positioned; a cam in contracting relation to said jaws to cause the jaws initially to hold the ring positioned upon the jaw carrier and thereafter to contract this ring; mechanism for causing initial movement of the cam with respect to the jaws to initially hold a ring; and means for positioning a bottle to be surrounded by the ring to engage the magazine to enable relative movement of the jaw carrier and magazine to permit the cam to move the jaws further to contract the ring.

3. A bottle capping machine including a movable magazine for holding rings and formed to permit rings to drop therefrom; a jaw carrier surrounding and assembled with said magazine and mounted to be movable therewith, this jaw carrier being formed to catch and position a ring falling from the magazine; a plurality of jaws mounted upon the jaw carrier and having ring holding formations in the zone in which the ring is positioned; mechanism for initially contracting said jaws to intially hold a ring and to further contract the jaws to contract the ring; and means for positioning a bottle to be surrounded by the ring and in relation to said jaw contracting mechanism to enable the bottle to cooperate with said mechanism in effecting the ring contracting movement of the jaws.

4. A bottle capping machine including a jaw carrier formed to catch and position a ring; a plurality of jaws mounted upon the jaw carrier and having ring holding formations in the zone in which the ring is positioned; a cam surrounding said jaw carrier and in contracting relation to said jaws to cause the jaws initially to hold the ring positioned upon the jaw carrier and thereafter to contract the ring; and means for positioning a bottle to be surrounded by the ring and in relation to said jaw contracting cam to enable the bottle to cooperate with said cam in effecting the ring contracting movement of the jaws.

5. A bottle capping machine including a movable magazine for holding rings and formed to permit rings to drop therefrom; mechanism for contracting the rings and including ring contracting jaws, a carrier for the jaws assembled with the magazine to be movable therewith, and a cam in contracting relation to the jaws and engaged by the jaws when the magazine and jaw carrier are moved; and means for positioning a bottle to be surrounded by the ring and in relation to said jaw contracting mechanism to enable the bottle to cooperate with said mechanism in effecting the ring contracting movement of the jaws.

In witness whereof, I hereunto subscribe my name this 20th day of June A. D., 1923.

OLOF N. TEVANDER.